United States Patent [19]

Chen et al.

[11] Patent Number: 5,691,391
[45] Date of Patent: Nov. 25, 1997

[54] PROCESS FOR MAKING AN INJECTION MOLDED FAN BLADE

[75] Inventors: Steve P. Chen, Chandler; John E. Schibler, Fountain Hills; Ramesh J. Patel, Mesa, all of Ariz.

[73] Assignee: McDonnell Douglas Helicopter, Meza, Ariz.

[21] Appl. No.: 349,378

[22] Filed: Dec. 5, 1994

Related U.S. Application Data

[60] Continuation of Ser. No. 120,059, Sep. 13, 1993, abandoned, which is a division of Ser. No. 933,115, Aug. 21, 1992, abandoned.

[51] Int. Cl.$^6$ .................................................. C08J 5/08
[52] U.S. Cl. .................. 521/99; 524/494; 524/496; 264/46.4; 264/46.7; 264/328.18
[58] Field of Search .................. 521/99, 142; 524/494, 524/499, 496; 264/46.4, 46.7, 328.18

[56] References Cited

U.S. PATENT DOCUMENTS

| | | | |
|---|---|---|---|
| 1,509,953 | 9/1924 | Johnson | 416/230 |
| 2,423,700 | 7/1947 | Hardy | 170/159 |
| 3,305,196 | 2/1967 | Hanlon | 244/123 |
| 4,077,921 | 3/1978 | Sharpe et al. | 260/2.5 B |
| 4,200,252 | 4/1980 | Logan et al. | 244/17.19 |
| 4,229,559 | 10/1980 | Cotter et al. | 526/271 |
| 4,263,413 | 4/1981 | Gardner et al. | 525/34 |
| 4,414,171 | 11/1983 | Duffy et al. | 264/249 |
| 4,477,228 | 10/1984 | Duffy et al. | 416/241 A |
| 4,605,355 | 8/1986 | Davis et al. | 416/208 |
| 4,866,110 | 9/1989 | Lee | 524/11 |
| 4,930,987 | 6/1990 | Stahl | 416/93 A |
| 4,948,068 | 8/1990 | Van Horn | 244/17.19 |
| 4,981,896 | 1/1991 | Okada et al. | 524/413 |
| 4,990,550 | 2/1991 | Iwanami et al. | 523/214 |
| 5,076,760 | 12/1991 | Weetman et al. | 416/204 R |
| 5,096,384 | 3/1992 | Immell et al. | 416/229 R |
| 5,118,257 | 6/1992 | Blakely et al. | 416/219 R |
| 5,156,786 | 10/1992 | Monroe | 264/112 |
| 5,213,476 | 5/1993 | Monroe | 416/230 |
| 5,222,297 | 6/1993 | Graff et al. | 29/889.71 |
| 5,403,161 | 4/1995 | Nolan et al. | 416/226 |

FOREIGN PATENT DOCUMENTS

| | | |
|---|---|---|
| 901587 | 7/1945 | France . |
| 1355427 | 2/1964 | France . |
| 215498 | 9/1986 | Japan . |
| 808685 | 2/1981 | U.S.S.R. . |

OTHER PUBLICATIONS

CA/03 (26) 216364q, Glass Reinforced Polymer, Jul. 3, 1985.

*Primary Examiner*—Vasu S. Jagannathan
*Assistant Examiner*—John J. Guarriello
*Attorney, Agent, or Firm*—Donald E. Stout

[57] ABSTRACT

A variable pitch fan for a helicopter equipped with a NOTAR® mechanical antitorque directional control system comprises a plurality of blade assemblies. Each blade assembly includes a blade portion, which is molded from a blended material which includes fiber reinforced polypropylene. A key to the invention is the use of long fibers, having a length of at least approximately one-half inch, for reinforcement, the long fibers providing for about twice the pull-out strength of short or chopped fibers. Another key aspect of the invention is the use of a blowing agent in the blended material, which serves to reduce weight and warpage by creating a foamed structure having a variable density, the structure retaining considerable strength because of the fiber reinforcement. The blade portion is molded about a spar which has holes therethrough, the holes providing a mechanical interlock between the blade and the spar.

10 Claims, 2 Drawing Sheets

PROCESS FOR MAKING AN INJECTION MOLDED FAN BLADE

This is a continuation of application Ser. No. 08/120,059, now abandoned filed Sep. 13, 1993 which is a division of application Ser. No. 07/933,155, filed 21 Aug. 1992, now abandoned.

BACKGROUND OF THE INVENTION

This invention relates to injection molded foamed structures, and more particularly to injection molded fan blades for use in the fan assembly of a helicopter equipped with a mechanical anti-torque directional control system in which no tail rotor is employed.

A concept has been developed for countering main rotor torque in helicopter propulsion systems by replacing the traditional tail rotor with a constant pressure circulation control tail boom. Sideward thrust is controlled by a thruster valve located at the aft end of the tail boom. A variable pitch fan mounted at the forward end of the tail boom provides the required airflow to the thruster. One particular version of such a mechanical antitorque directional control system, denoted by the trademark NOTAR, has been developed by McDonnell Douglas Helicopter Co. of Mesa, Ariz., and is more completely described in U.S. Patents Nos. 4,200,252 and 4,948,068, herein incorporated by reference.

The variable pitch fan for the NOTAR® control system referred to above incorporates a plurality of fan blades, preferably thirteen, mounted about a fan hub having means for effecting pitch control for the blades. The blade as originally designed consists of a foam core, a fiberglass epoxy skin, and an abrasion strip bonded to the leading edge. Total cycle time for building one composite blade is more than eight hours, which includes two hand lay-ups, two oven cures, two trims, one painting cycle, and a secondary bonding of the abrasion strip to the blade leading edge. Because of the labor intensive manufacturing process, fabrication costs approximate $500 per blade, with a production scrap rate ranging close to 50 percent. In addition, the composite fan blade has a brittle foam core which is susceptible to impact damage during handling and in operation.

Prior art injection molding processes, while capable of producing fan blades much more inexpensively than is possible using the above described composite process, would tend to produce blades having inadequate strength characteristics and/or excess weight.

What is needed, therefore, is a fan blade, and a process for making same, which will be relatively inexpensive while having adequate strength, weight, and durability characteristics to ensure dependable operation in a crucial, demanding environment.

SUMMARY OF THE INVENTION

This invention solves the problem outlined above by providing a fan blade assembly, and a method of making same, wherein costs are reduced by up to 98 percent per blade (i.e. a cost of about $10 per blade, vs. $500 per blade using the prior art method), the production cycle time is reduced to about four minutes, the scrap rate is reduced to about two percent, the abrasion strip and topcoat are eliminated, and impact properties are improved.

The inventive injection molded rotor blade assembly comprises a blade portion, molded from a blended material which includes a thermoplastic polymer, preferably polypropylene, reinforced with long fibers, and a spar to which the blade portion is attached. A key to the invention is the use of long fibers, having a length of at least approximately one-half inch, for reinforcement, the long fibers providing for about twice the pull-out strength of short or chopped fibers. The fibers comprise about 15–45 percent of the blended material. Another key aspect of the invention is the use of a blowing (or foaming) agent in the blended material, preferably comprising about five percent of the blended material. The blowing agent reduces weight and warpage by creating a foamed structure having a variable density, which retains considerable strength because of the fiber reinforcement. The result is a blade portion which has optimal strength and weight characteristics.

In another aspect of the invention, a constant pressure circulation control tail boom for a helicopter is disclosed. The tail boom has a variable pitch fan at its forward end for supplying a flow of air therethrough. The fan comprises a fan hub, a plurality of pitch horns, and a plurality of fan blade assemblies, with the number of fan blade assemblies being equal to the number of pitch horns. Each fan blade assembly comprises a blade portion molded from a blended material which includes a fiber reinforced thermoplastic polymer and a blowing agent, as well as a spar to which the blade portion is attached. The spar of each blade is further attached to a corresponding pitch horn, so that the fan blade assemblies are thereby mounted to the pitch horns of the variable pitch fan.

In yet another aspect of the invention, a method of making an injection molded fan blade assembly is disclosed. The method comprises the steps of blending together a molding material which includes a fiber reinforced thermoplastic polymer, the fibers preferably being comprised of either graphite carbon or glass, heating the molding material to a viscous molten state, injecting the molding material under high pressure into a mold which has a spar insert in place therein about which the molding material is molded, and cooling the molding material so that it forms a blade which is attached to the spar insert to form the fan blade assembly.

In yet another aspect of the invention, an injection molded foamed structure having a variable density and being useful in dynamic, high torque environments is disclosed. This structure comprises a blended material including a thermoplastic polymer reinforced with long fibers having a length of at least approximately one-half inch and a blowing agent. The fiber reinforcement in combination with the blowing agent gives the foamed structure optimal strength and weight characteristics. This structure may be molded into a variety of parts for a number of different applications where high strength but lightweight characteristics are essential, such as, for example, a rotary drive shaft.

The above mentioned and other objects and features of this invention and the manner of attaining them will become apparent, and the invention itself will be best understood, by reference to the following description taken in conjunction with the accompanying illustrative drawings.

DETAILED DESCRIPTION OF THE DRAWINGS

Figure 1:
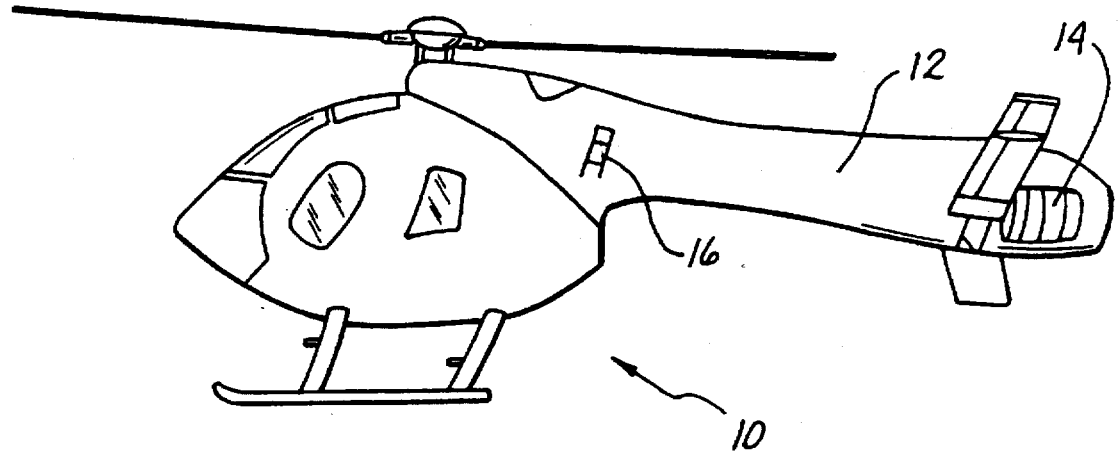
FIG. 1 is a side elevational view of a helicopter having a NOTAR mechanical anti-torque directional control system, which includes the inventive fan blade assemblies claimed in the present application.

Referring now to the drawings, FIG. 1 shows a helicopter 10 having a tail boom 12, which incorporates a NOTAR mechanical antitorque directional control system developed and manufactured by McDonnell Douglas Helicopter Company, headquartered in Mesa, Ariz. The details of the NOTAR directional control system are taught in U.S. Pat. Nos. 4,200,252 and 4,948,068, both owned by the same assignee as the instant application, and herein fully incorporated by reference, as noted in the BACKGROUND OF THE INVENTION portion of this specification.

In brief, the NOTAR system shown in FIG. 1 employs a circulation control tail boom 12 and a jet thruster 14 in place of a conventional tail rotor. In this system, low pressure air is provided by a variable pitch axial flow fan assembly 16, which is mounted in the helicopter fuselage. This low pressure air is ejected from at least one thin horizontal slot (not shown) on the right side of the tail boom 12. The jets produced by this air flow follow the contour of the tail boom and induce the main rotor wake to do the same. This action produces lift on the tail boom 12 in the direction required to counteract the torque produced by the main rotor. The remaining air from the fan assembly 16 exits the tail boom 12 through the jet thruster 14, which produces a force which supplements that produced by the circulation control tail boom. The jet thruster 14 also produces all of the yaw maneuvering forces for the helicopter.

Figure 2:
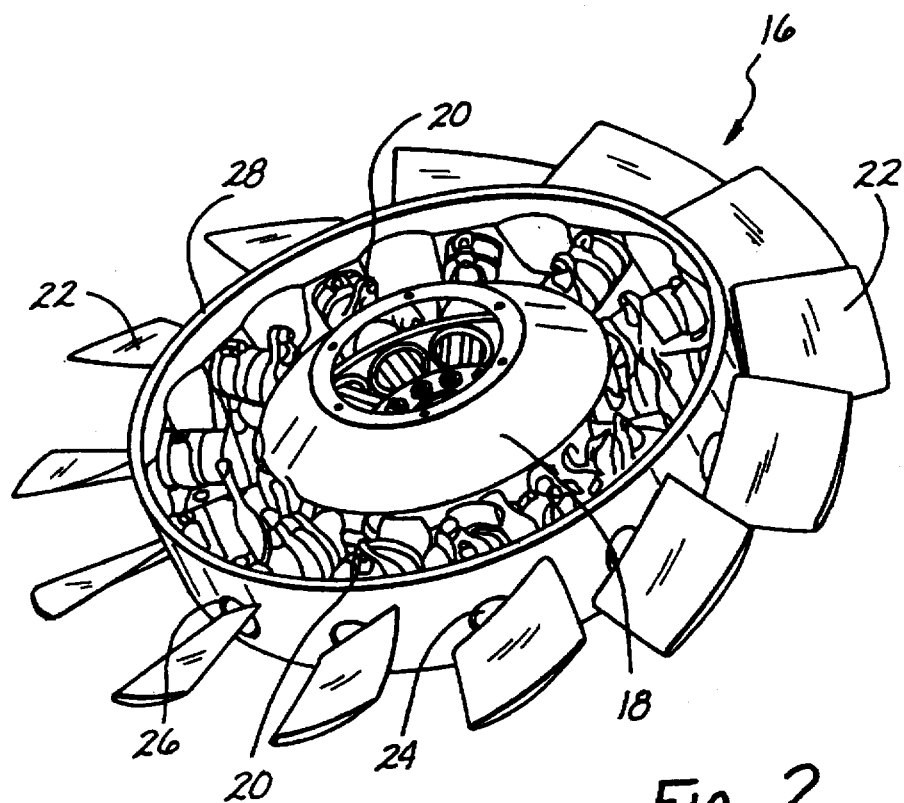
FIG. 2 is a perspective view, in isolation, of the fan assembly used in the NOTAR system, including the inventive fan blade assemblies.

Referring now to FIG. 2, the fan assembly 16 is shown in greater detail. The fan assembly 16 includes a fan hub 18, about which a plurality of pitch horns 20 are arrayed. Outwardly of each pitch horn 20 lies a corresponding fan blade 22. Each fan blade 22 is operatively connected to its corresponding pitch horn 20 by means of a spar 24, which extends through an aperture 26 in an outer fan ring 28. The spar 24 is in turn operatively connected to the fan hub 18. In operation, the pitch of each individual fan blade 22 may be varied by means of external controls (not shown) which act through the fan hub 18 to manipulate the pitch horns 20, in a manner known in the prior art.

Figure 3:
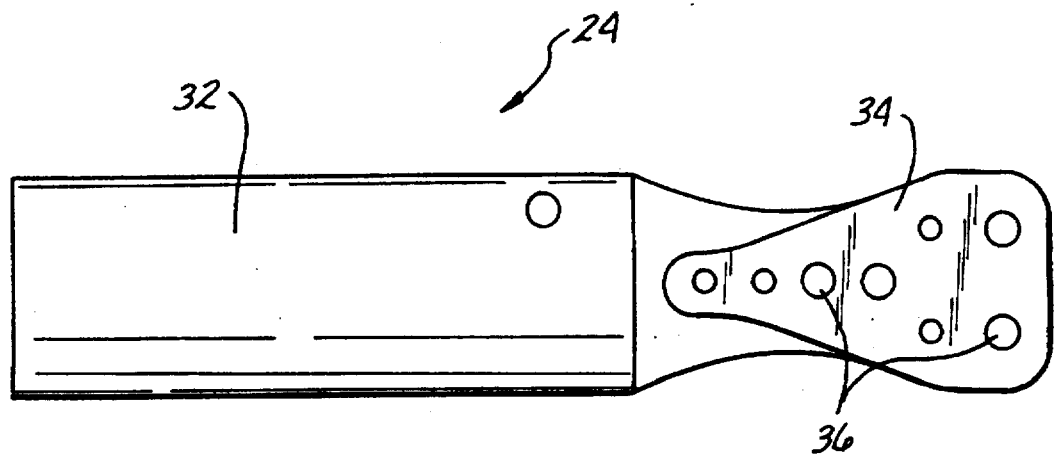
FIG. 3 is a top view of the spar insert which forms a part of the inventive fan blade assembly.
Figure 4:
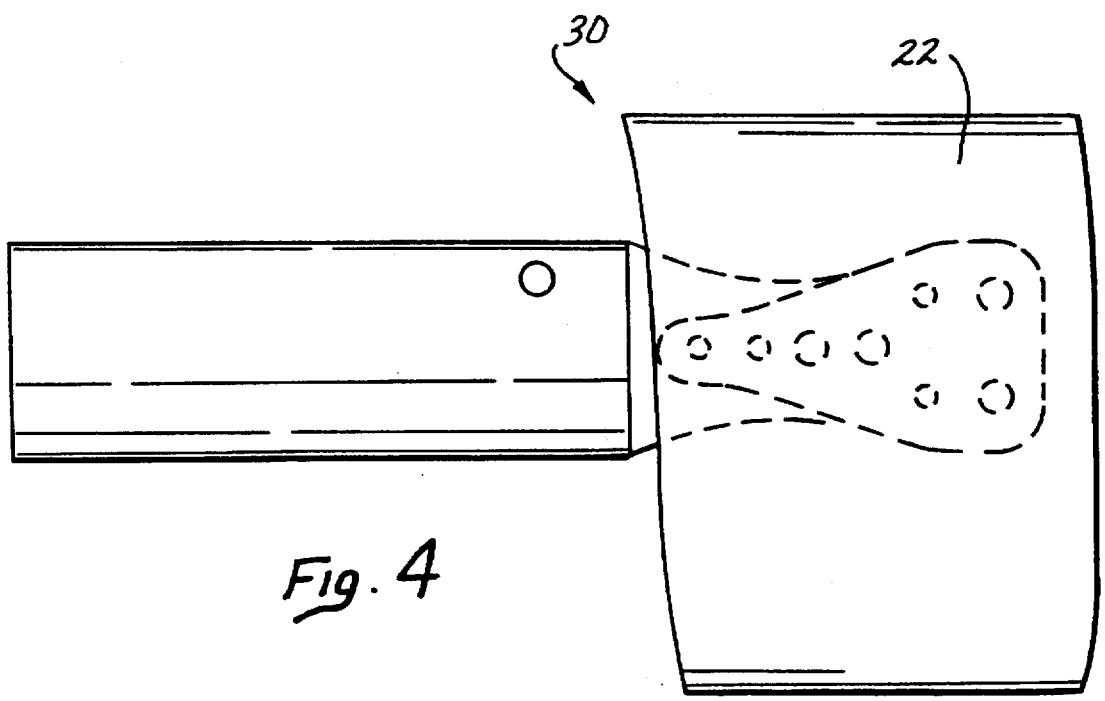
FIG. 4 is a top view of a completed fan blade assembly, which shows in phantom the portion of the spar insert about which the blade portion has been molded.

FIGS. 3 and 4 show a fan blade assembly 30 according to the presently claimed invention, which comprises both the fan blade 22 in combination with the spar 24. As shown particularly in FIG. 3, the spar 24 has a first generally cylindrically shaped portion 32 and a second contoured portion 34. The second portion 34 has at least one and preferably a plurality of holes 36 therethrough, which are for a purpose to be explained hereinbelow. FIG. 4 shows the entire fan blade assembly 30, including the spar portion 24 and the blade portion 22. The blade 22 is molded about the second spar portion 34 in such a manner that the spar 24 is firmly and securely inserted into the blade 22.

In accordance with the invention, the fan blade assembly 30 is fabricated using a one-step injection molding process. The process involves blending together a molding material which is primarily comprised of a thermoplastic polymer resin which is reinforced with fibers. The preferred thermoplastic polymer is polypropylene, although other materials such as polyetherimide, polyphenylene sulfide, polyetheretherketone, polyphthalamide, polyamide, polysulfone, polyarylsulfone, polyethersulfone, polybutylene terephtalate, polyethylene terephthalate, or polyamide-imide, for example, may be used if a very high temperature operating environment is contemplated. The tradeoff when using these alternative materials would be a higher weight factor, since polypropylene has a superior strength to weight ratio. With respect to the fibers employed in the blended material, it is preferred to use long fibers, having a length of at least about one-half inch, because the longer fibers provide greater surface and linear distance of interface with the resin, and thus provide better support strength and mechanical properties than shorter fibers. Fan blades which are reinforced with long fibers, rather than short fibers, have been shown in tests conducted by the inventor to have approximately twice the pull-out strength. Preferably, the fibers should comprise about 15–45 percent of the entire material mix, with that range being optimized at about 30 percent. It is preferred that the fibers be comprised of either glass or graphite carbon, though other fiber materials could be employed.

In addition to the 30 percent long fiber reinforced polypropylene, the blended material preferably includes both a blowing (foaming) agent, and a color pigment (preferably white), as well as a UV stabilizer. The blowing agent is preferably celogen, and should comprise about 1–10 percent of the blended material, with 5 percent being preferred. The color pigment preferably comprises about one-half to one percent of the material. The blowing agent, which makes the polypropylene open-celled, is used to reduce weight and warpage, and in fact reduces the weight of the blade assembly 30 by as much as 20 percent. The quantity of blowing agent employed is critical, however, since the blowing agent tends to undermine the reinforcement provided by the long glass or graphite carbon fibers, requiring a careful balance to provide optimum properties.

Once the molding material has been blended, the second step in the inventive process is to heat the material to a viscous molten state. Then, the molten molding material is injected under high pressure into a mold where the spar insert 24 has previously been placed to be molded around. Once the injection step is completed the blade assembly is essentially finished. The mold is cooled in a known fashion, and then the finished blade assembly 30 is removed therefrom.

As noted above, the spar 24 functions as the backbone for the blade assembly 30, and provides a means of attachment to the pitch control horn 20 and fan hub 18 (FIG. 2). The holes 36 in the second spar portion 34 become filled with the blended material which forms the blade portion 22 during the injection step, and thereby serve as mechanical fasteners to interlock with the blade 22, thus assuring that blade 22 and the spar 24 are securely attached.

Although injection molding has been widely used in both the automotive and aerospace industries, the fan blade as described herein is the first of its kind to be used as a critical structure on an aircraft. This material application fully utilizes the unique characteristics of a foamed plastic part—the formation of a solid skin on the part surface in contact with the walls of the mold and the insert. The combination of this solid skin, the long fibers, and the blowing agent produce stiffness, weight, load strength and durability properties desired for applications such as the high shear, high speed NOTAR system fan structure.

Although an exemplary embodiment of the invention has been shown and described, many changes, modifications, and substitutions may be made by one having ordinary skill in the art without departing from the spirit and scope of the invention. In particular, it should be noted that the invention has much broader applicability than as a fan blade in a NOTAR antitorque control system, since such a fiber reinforced, variable density, injection molded blade may be used in many different rotor blade applications. The invention could even be applied to other applications unrelated to the rotor blade field, particularly in dynamic, high torque environments, where strength and weight are critical parameters. An example of such an environment would be to employ the invention as a rotary drive shaft or the like. Therefore, the scope of the invention is to be limited only in accordance with the following claims.

What is claimed is:

1. A method of making an injection molded fan blade assembly, comprising the steps of:

a) blending together a molding material which includes a thermoplastic polymer, fibers, and a blowing agent;

b) heating the molding material to a viscous molten state;

c) injecting said molding material under high pressure into a mold, said mold having a spar insert in place therein about which the molding material is molded; and d) cooling said molding material, such that it forms a blade which is attached to said spar insert to form said fan blade assembly.

2. The method as recited in claim 1, wherein said fibers used in the blending step are long fibers, having a length of at least approximately one-half inch, and are comprised of either glass or graphite carbon.

3. The method as recited in claim 1, wherein said fibers used in the blending step comprise approximately 15-45 percent of the molding material.

4. The method as recited in claim 1, wherein said fibers used in the blending step comprise approximately 30 percent of the molding material.

5. The method as recited in claim 1, wherein said thermoplastic polymer used in the blending step comprises polypropylene.

6. The method as recited in claim 1, wherein said blowing agent used in the blending step comprises approximately 1-10 percent of the molding material.

7. The method as recited in claim 1, wherein said blowing agent used in the blending step comprises approximately 5 percent of the molding material.

8. The method as recited in claim 1, wherein said blending step further includes the step of blending a color pigment into said molding material, said color pigment comprising approximately 0.5-1 percent of the molding material.

9. The method as recited in claim 1, wherein said blade is formed to comprise an interior portion having a generally open-celled structure, said interior portion being enclosed by an exterior skin formed from the blended material, which is substantially solid.

10. The method as recited in claim 1, and further comprising the step of providing at least one hole in said spar insert, such that during said injection step the molding material flows through the at least one hole, thereby mechanically interlocking the blade and the spar insert upon completion of said molding material cooling step to form said blade assembly.

* * * * *